(12) United States Patent
Lin et al.

(10) Patent No.: US 7,065,356 B2
(45) Date of Patent: Jun. 20, 2006

(54) SYSTEMS AND METHODS FOR PREVENTING UNAUTHORIZED USE OF ROAMING NUMBERS IN A WIRELESS TELECOMMUNICATIONS SYSTEM

(75) Inventors: Janette Lin, Dallas, TX (US); Victor Corby, Plano, TX (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 553 days.

(21) Appl. No.: 10/016,853

(22) Filed: Dec. 14, 2001

(65) Prior Publication Data

US 2003/0114154 A1    Jun. 19, 2003

(51) Int. Cl.
*H04Q 7/20* (2006.01)
(52) U.S. Cl. .................. 455/432; 455/433; 455/411; 455/445; 455/414; 455/415; 455/403; 455/412; 455/435; 455/436; 455/437; 455/439; 455/443; 380/248
(58) Field of Classification Search .......... 455/432.1, 455/433, 411, 445, 432, 414, 415, 403, 412, 455/435, 436, 459; 380/248
See application file for complete search history.

(56) References Cited

U.S. PATENT DOCUMENTS

| | | | | |
|---|---|---|---|---|
| 5,400,390 A | * | 3/1995 | Salin | 455/433 |
| 5,930,701 A | * | 7/1999 | Skog | 455/415 |
| 5,940,512 A | * | 8/1999 | Tomoike | 380/248 |
| 6,101,382 A | * | 8/2000 | Granberg | 455/414.1 |
| 6,157,832 A | * | 12/2000 | Lahtinen | 455/433 |
| 6,285,871 B1 | * | 9/2001 | Daniels | 455/411 |
| 6,640,108 B1 | * | 10/2003 | Lu et al. | 455/463 |
| 6,725,037 B1 | * | 4/2004 | Grootwassink | 455/433 |
| 6,745,023 B1 | * | 6/2004 | Offer | 455/410 |
| 2002/0072367 A1 | * | 6/2002 | Osafune et al. | 455/433 |
| 2002/0197991 A1 | * | 12/2002 | Anvekar et al. | 455/432 |

FOREIGN PATENT DOCUMENTS

JP      410013945 A   *   1/1998

OTHER PUBLICATIONS

Mouly et al., The GSM System for Mobile Communications, 1992, Chapter 7.2 "Security Management," pp. 477-492.*

* cited by examiner

*Primary Examiner*—Joseph Feild
*Assistant Examiner*—David Q. Nguyen
(74) *Attorney, Agent, or Firm*—Roger Burleigh

(57) ABSTRACT

Systems and methods for preventing unauthorized use of roaming numbers in a wireless telecommunications system. Upon receipt of a call request for a mobile terminal at a Gateway Mobile Switching Center (GMSC), the GMSC queries a Home Location Register (HLR). The HLR requests a roaming number for the mobile terminal from a Mobile Switching Center (MSC). The MSC allocates a roaming number for the mobile terminal, assigns an authentication code, and sends to the HLR. The HLR receives the roaming number and authentication code and relays to the GMSC. The GMSC sends a call setup request to the MSC; the call setup request includes the roaming number and the authentication code. The MSC confirms the authentication code and, if the authentication code for the roaming number is confirmed, completes the call request to the mobile terminal.

16 Claims, 3 Drawing Sheets

SYSTEMS AND METHODS FOR PREVENTING UNAUTHORIZED USE OF ROAMING NUMBERS IN A WIRELESS TELECOMMUNICATIONS SYSTEM

TECHNICAL FIELD OF THE INVENTION

The present invention is directed, in general, to communications systems and, more specifically, to apparatus, systems and methods to prevent unauthorized use of roaming numbers in a wireless telecommunications system.

BACKGROUND OF THE INVENTION

The world is currently experiencing revolutionary changes in communications systems, brought about, in part, by the general availability and evolution of wireless telephony systems. Immediately after the first mobile user headed off into the sunset with a cellular telephone, or Mobile Station (MS), however, someone else wondered where they went. Unlike conventional wireline telephones, wireless callers are not usually associated with a fixed location, which provides many benefits such as freedom of use over large geographical areas. Because the location of a MS is usually not fixed, it is necessary for the wireless telephony system to be able to determine where the MS is located so that calls can be properly routed to it.

In order to route a call to a MS that is outside of the home area of the subscriber's service provider, a roaming number must be used. When a call is made to a MS, a Gateway Mobile Switching Center (GMSC) sends a query to a Home Location Register (HLR) to determine how to route a call to the MS. The HLR keeps track of the approximate location of the MS within the wireless telephony network. The HLR requests a roaming number from the Mobile Switching Center serving the geographical area in which the MS is currently located. The HLR forwards the roaming number to the GMSC, which then uses the number to setup the call toward the serving MSC.

Roaming numbers are a MSC switch property; they belong to the MSC. Roaming numbers are public network numbers and are associated with a specific MSC; i.e., a call to a roaming number will always be routed to a specific MSC. Network operators assign a particular set of roaming numbers to each MSC switch so that terminating calls to a MS served by the MSC can be completed using one of the MSC's associated roaming numbers. The public network, e.g., the Public Switched Telephone Network (PSTN) or the Public Land Mobile Network (PLMN), uses a routing mechanism that routes calls to a particular MSC when a roaming number associated with that MSC is allocated to a call request to a MS within the service area of the MSC. A call setup request to a roaming number associated with a MSC is performed in the same manner as any ordinary call.

Because a call setup request to a roaming number is performed in the same manner as any ordinary call, it is possible for any person who discovers the roaming numbers associated with a MSC to place malicious calls to one or more of the roaming numbers associated with each MSC within a wireless network. A conventional MSC does not have any mechanisms to ensure that an incoming call request is, in fact, associated with a call request to a MS within the service area of the MSC. Accordingly, there is a need in the art for systems and methods to prevent unauthorized use of roaming numbers in a wireless telecommunications system.

SUMMARY OF THE INVENTION

To address the above-discussed deficiencies of the prior art, the present invention provides systems and methods related to preventing unauthorized use of roaming numbers in a wireless telecommunications system.

Upon receipt of a call request for a mobile terminal at a Gateway Mobile Switching Center (GMSC), the GMSC queries a Home Location Register (HLR). The HLR requests a roaming number for the mobile terminal from a Mobile Switching Center (MSC). The MSC allocates a roaming number for the mobile terminal, assigns an authentication code, and sends to the HLR. The HLR receives the roaming number and authentication code and relays to the GMSC. The GMSC sends a call setup request to the MSC; the call setup request includes the roaming number and the authentication code. The MSC confirms the authentication code and, if the authentication code for the roaming number is confirmed, completes the call request to the mobile terminal. The use of an authentication code can prevent attacks on MSC resources by the unauthorized use of roaming numbers.

The authentication code assigned to a roaming number for a particular call can be dynamically selected. Various methods known in the art for creating random codes can be used. In some embodiments, the authentication code can be a function of the roaming number, the time at which the roaming number is requested, and/or, the date on which the roaming number is requested. The principles of the invention are not limited to any particular method for selecting or calculating an authentication code.

The methods disclosed herein for preventing unauthorized use of roaming numbers in a wireless telecommunications system depend on the adaptation of particular nodes within a wireless telecommunications system. These nodes include a Gateway Mobile Switching Center (GMSC), a Home Location Register (HLR), and a Mobile Switching Center (MSC).

An MSC, adapted to prevent unauthorized use of roaming numbers in accordance with the principles disclosed herein, is operative to: receive a request for a roaming number from a Home Location Register (HLR) associated with a mobile terminal located within the geographical service area of the MSC; allocate a roaming number for the mobile terminal; assign an authentication code to the roaming number; send a response to the request for roaming number to the HLR, wherein the response includes the roaming number and the authentication code, and the HLR relays the roaming number and the authentication code to the GMSC that has received a call request for the mobile terminal; receive a call setup request from the GMSC, wherein the call setup request includes the roaming number and the authentication code; confirm the authentication code in the call setup request; and, if the authentication code for the roaming number is confirmed, complete the call request to the mobile terminal.

A GMSC, adapted to prevent unauthorized use of roaming numbers in accordance with the principles disclosed herein, is operative to: receive a call request for a mobile; send a request for routing information to HLR associated with the mobile terminal, wherein the request for routing information causes the HLR to send a request for a roaming number to the MSC associated with the roaming area in which the mobile terminal is geographically located, and wherein the request for a roaming number causes the MSC to allocate a roaming number for the mobile terminal, assign an authentication code to the roaming number, and send a response to the request for roaming number to the HLR, the response including the roaming number and the authentication code; receive the roaming number and the authentication code from the HLR; send a call setup request to the MSC, wherein the call setup request includes the roaming number and the authentication code, and wherein the MSC completes the call request only upon confirming the authentication code for the roaming number.

An HLR, adapted to prevent unauthorized use of roaming numbers in accordance with the principles disclosed herein, is operative to: receive a request for routing information from a GMSC, the request for routing information identifying a mobile terminal associated with the HLR for which the GMSC has received a call request; send a request for a roaming number to MSC associated with the roaming area in which the mobile terminal is geographically located, wherein the request for a roaming number causes the MSC to allocate a roaming number for the mobile terminal, assign an authentication code to the roaming number, and send a response to the request for roaming number to the HLR, the response including the roaming number and the authentication code; receive the roaming number and the authentication code from the MSC; send the roaming number and the authentication code to the GMSC, whereupon the GMSC can send a call setup to the MSC, the call setup request including the roaming number and the authentication code, wherein the MSC completes the call request only upon confirming the authentication code for the roaming number.

The foregoing has outlined, rather broadly, the principles of the present invention so that those skilled in the art may better understand the detailed description of the exemplary embodiments that follow. Those skilled in the art should appreciate that they can readily use the disclosed conception and exemplary embodiments as a basis for designing or modifying other structures and methods for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following detailed description taken in conjunction with the accompanying drawings, in which.

DETAILED DESCRIPTION

Figure 1:
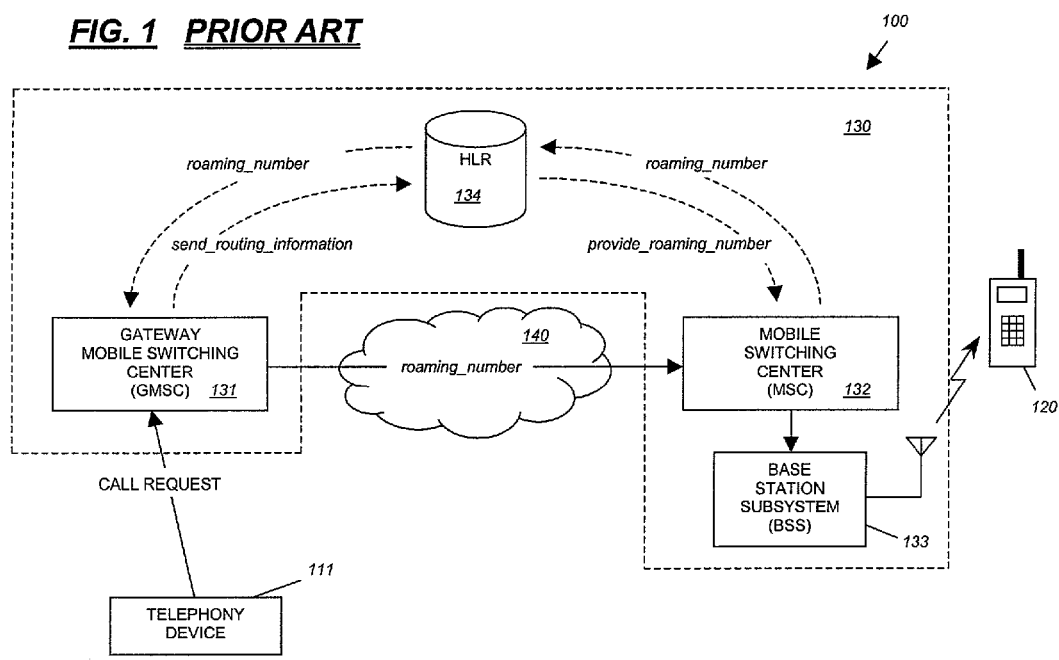
FIG. 1 illustrates a signaling diagram of a prior art system for providing a roaming number for a mobile terminal in a wireless telecommunications network.

Referring to FIG. 1, illustrated is a simplified signaling diagram of a prior art system 100 for providing a roaming number for a mobile terminal 120 subscribed to a wireless telecommunications network 130. The wireless telecommunications network 130, or Public Land Mobile Network (PLMN), conventionally includes a Gateway Mobile Switching Center (GMSC) 131, at least one Mobile Switching Center (MSC) 132 coupled to the GMSC through the Public Switched Telephone Network 140, at least one Base Station Subsystem (BSS) 133 coupled to each MSC 132, and a Home Location Register (HLR) 134.

Using a telephony device 111, such as a conventional telephone or a wireless terminal, a call request directed to a mobile device 120 is routed to the GMSC 131; the call request includes a unique identifier of the mobile device 120, such as a Mobile Station Integrated Service Digital Network (MSISDN) number. The GMSC 131 then sends an inquiry, e.g., Send_Routing_Information, to a location resource, e.g., HLR 134, to determine the location of the mobile device 120 having the unique identifier. The HLR 134 queries a database using the unique identifier, wherein the database includes an association between the unique identifier and the serving node, e.g., MSC 132, of the wireless telecommunications network 130 in communication with the mobile device 120. The HLR 134 then sends a request, e.g., Provide_Roaming_Number, to the MSC 132 to obtain a roaming number, e.g., a Mobile Subscriber Routing Number (MSRN), for the mobile device 120. The MSC 132 responds to the Provide_Roaming_Number request by allocating a roaming number for the mobile terminal 120 for the particular call request and sending the roaming number to the HLR 134. The HLR 134 sends the MSRN to the GMSC 131, which uses the MSRN to route the call request to the MSC 132 through the PSTN 140. The MSC 132 completes the call to the mobile device 120 through the proper BSS 133 in communication with the mobile device 120.

As noted previously, however, a problem with roaming numbers associated with a MSC is that such numbers may become known to persons that may seek to interfere with the operation of the wireless network. For example, telephony device 111 could be a computer having a modem. A malicious user could program the computer to continuously dial one or more roaming numbers associated with MSC 132, thus interfering with the allocation of roaming numbers by MSC 132 to valid calls directed to mobile terminals, such as mobile terminal 120. The invention disclosed herein overcomes this problem.

Figure 2:
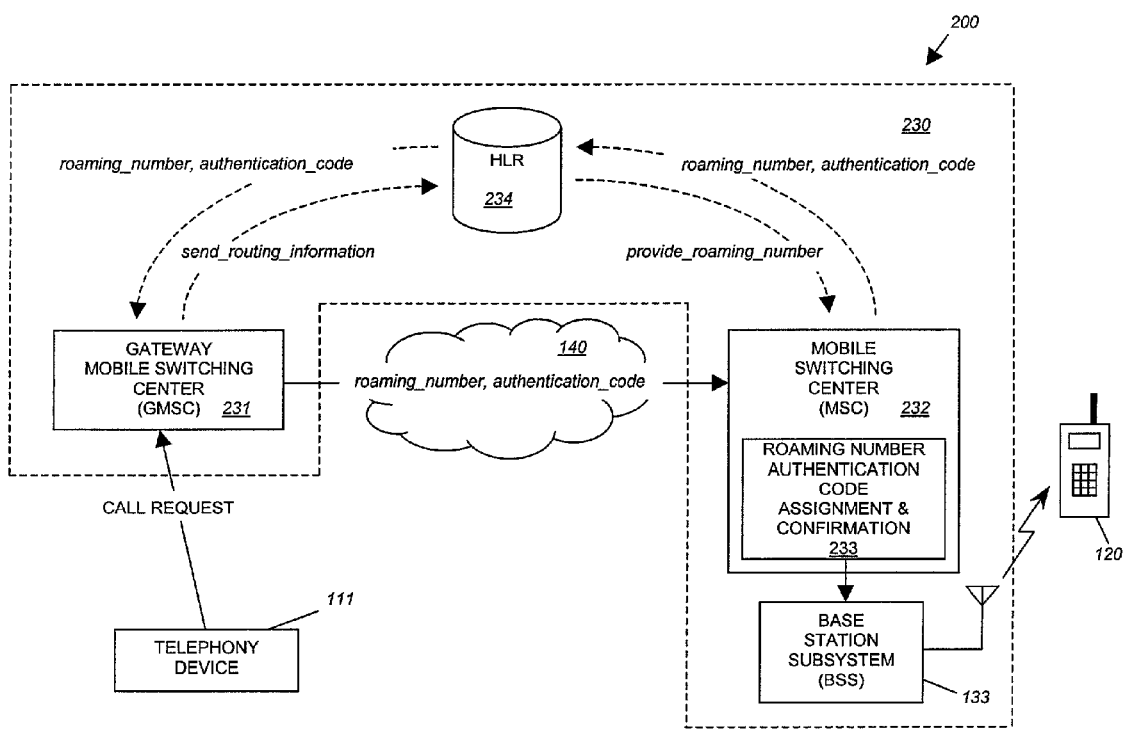
FIG. 2 illustrates a signaling diagram for an exemplary system to prevent unauthorized use of roaming numbers in a wireless telecommunications system in accordance with the principles of the present invention.

Turning now to FIG. 2, illustrated is a signaling diagram for an exemplary system 200 to prevent unauthorized use of roaming numbers in a wireless telecommunications system in accordance with the principles of the present invention. As in FIG. 1, the wireless telecommunications network 230 includes a Gateway Mobile Switching Center (GMSC) 231, at least one Mobile Switching Center (MSC) 232 coupled to the GMSC through the Public Switched Telephone Network 140, at least one Base Station Subsystem (BSS) 133 coupled to each MSC 232, and a Home Location Register (HLR) 234.

Using telephony device 111, such as a conventional telephone or a wireless terminal, a call request directed to a mobile device 120 is routed to the GMSC 231; the call request includes a unique identifier of the mobile device 120, such as a Mobile Station Integrated Service Digital Network (MSISDN) number. The GMSC 231 then sends an inquiry, e.g., Send_Routing_Information, to a location resource, e.g., HLR 234, to determine the location of the mobile device 120 having the unique identifier. The HLR 234 queries a database using the unique identifier, wherein the database includes an association between the unique identifier and the serving node, e.g., MSC 232, of the wireless telecommunications network 230 in communication with the mobile device 120. The HLR 234 then sends a request, e.g., Provide_Roaming_Number, to the MSC 232 to obtain a roaming number, e.g., a Mobile Subscriber Routing Number (MSRN), for the mobile device 120.

The MSC 232 includes functionality to provide assignment and confirmation of a roaming number authentication code. The authentication code assigned to a roaming number for a particular call can be dynamically selected. Various methods known in the art for creating random codes can be used. In some embodiments, the authentication code can be a function of the roaming number, the time at which the roaming number is requested, and/or, the date on which the roaming number is requested. The principles of the invention are not limited to any particular method for selecting or calculating an authentication code.

Once the MSC 232 has allocated a roaming number and assigned it an authentication code, the roaming number and authentication code are sent to the HLR 1234. The HLR 234 relays the roaming number and authentication code to the GMSC 231. The GMSC 231 then sends a call setup request to the MSC 232, including the roaming number and the authentication code; the call setup request can be sent, for example, using a Signaling System 7 (SS7) network associated with the PSTN 140. When the MSC 232 receives the call setup request, it confirms that the received authentication code is the proper code for the received roaming number. If the authentication code is correct, the MSC 232 completes the call setup request, and communication is established between the telephony device 111 and mobile terminal 120.

Figure 3:
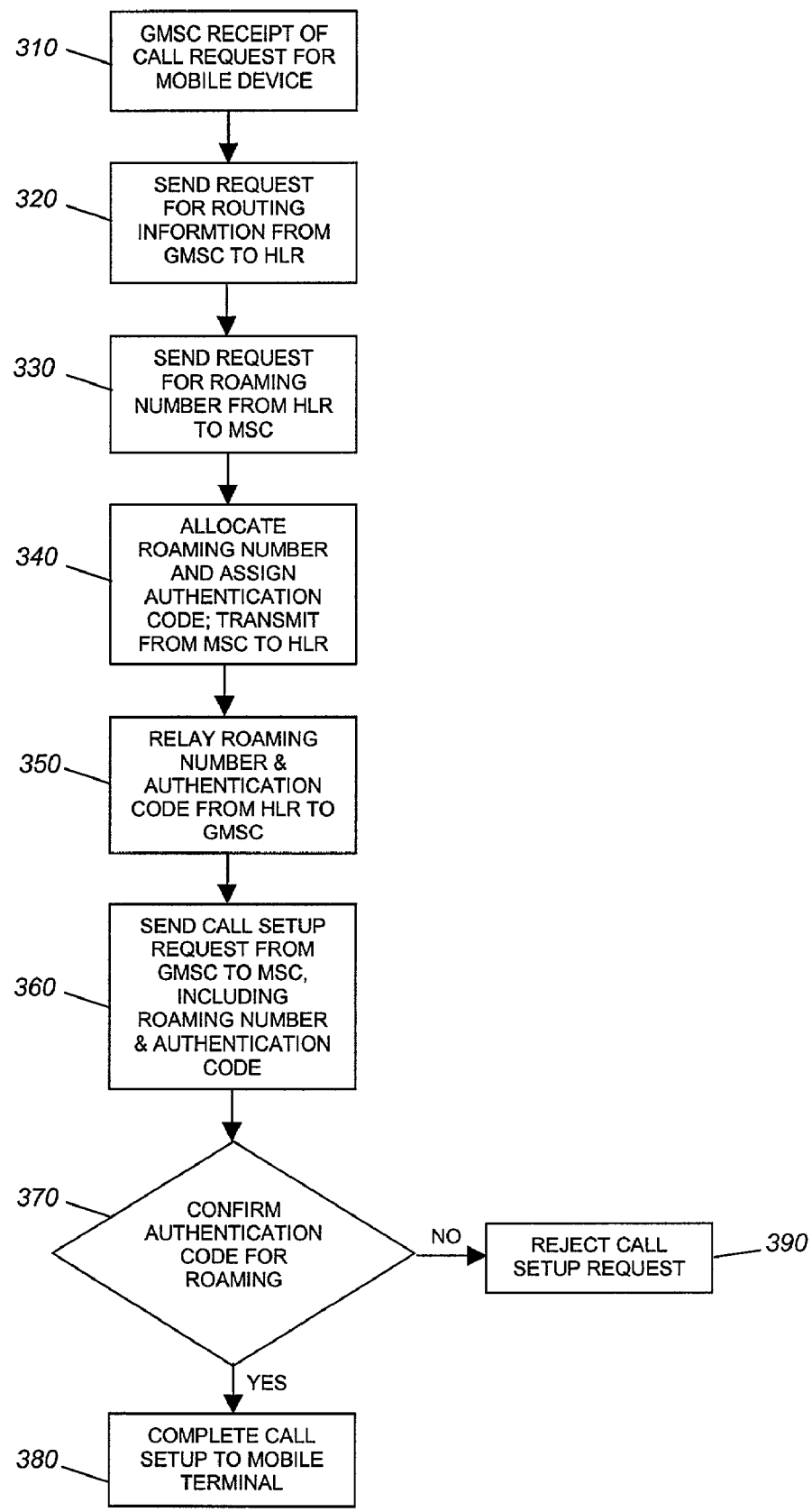
FIG. 3 illustrates an exemplary flowchart of a method to prevent unauthorized use of roaming numbers in a wireless telecommunications system in accordance with the principles of the present invention.

Turning now to FIG. 3, illustrated is an exemplary flowchart 300 of a method to prevent unauthorized use of roaming numbers in a wireless telecommunications system in accordance with the principles of the present invention. The method 300 can be embodied in software, hardware, or a combination thereof, within the computer processing systems associated with GMSC 231, HLR 234 and MSC 232.

In a step 310, a call request for a mobile terminal is received at GMSC. In a step 320, the GMSC queries a Home Location Register HLR for routing information for the mobile terminal. In a step 330, the HLR requests a roaming number for the mobile terminal from the MSC within the geographical area in which the mobile terminal is currently located. In a step 340, the MSC allocates a roaming number for the mobile terminal, assigns an authentication code, and sends to the HLR. In a step 350, the HLR receives the roaming number and authentication code and relays to the GMSC. In a step 360, the GMSC sends a call setup request to the MSC; the call setup request includes the roaming number and the authentication code. In a step 370, the MSC confirms the authentication code and, if the authentication code for the roaming number is confirmed, completes the call request to the mobile terminal (Step 380); otherwise, the MSC rejects the call setup request (Step 390).

From the foregoing, those skilled in the art will recognize that the present invention advances the state of the art of communications systems, providing systems and methods related to preventing unauthorized use of roaming numbers in a wireless telecommunications system. Although the present invention has been described in detail, those skilled in the art will conceive of various changes, substitutions and alterations to the exemplary embodiments described herein without departing from the spirit and scope of the invention in its broadest form. The exemplary embodiments presented herein illustrate the principles of the invention and are not intended to be exhaustive or to limit the invention to the form disclosed; it is intended that the scope of the invention only be limited by the claims appended hereto, and their equivalents.

What is claimed is:

1. A method for preventing unauthorized use of roaming numbers in a wireless telecommunications system, said method comprising the steps of:
   receiving a call request for a mobile terminal at a Gateway Mobile Switching Center (GMSC);
   sending a request for routing information from said GMSC to a Home Location Register (HLR) associated with said mobile terminal;
   sending a request for a roaming number from said HLR to the Mobile Switching Center (MSC) associated with the roaming area in which said mobile terminal is geographically located:
   allocating, by said MSC, a roaming number for said mobile terminal;
   assigning, by said MSC, an authentication code to said roaming number;
   sending a response to said request for roaming number from said MSC to said HLR, said response including said roaming number and said authentication code;
   receiving said roaming number and said authentication code at said HLR;
   sending said roaming number and said authentication code from said HLR to said GMSC;
   sending a call setup request from said GMSC to said MSC, said call setup request including said roaming number and said authentication code;
   confirming, by said MSC, said authentication code in said call setup request; and,
   if said authentication code for said roaming number is confirmed by said MSC, completing said call request to said mobile terminal.

2. The method recited in claim 1, wherein said authentication code is a function of said roaming number.

3. The method recited in claim 1, wherein said authentication code is a function of the time at which said roaming number is requested.

4. The method recited in claim 1, wherein said authentication code is a function of the date on which said roaming number is requested.

5. A wireless telecommunications system Mobile Switching Center (MSC) adapted to prevent unauthorized use of roaming numbers, said MSC operative to:
   receive a request for a roaming number from a Home Location Register (HLR) associated with a mobile terminal located within the geographical service area of said MSC;
   allocate a roaming number for said mobile terminal;
   assign an authentication code to said roaming number;
   send a response to said request for roaming number from said MSC to said HLR, said response including said roaming number and said authentication code, said HLR relaying said roaming number and said authentication code to a Gateway Mobile Switching Center (GMSC) that has received a call request for said mobile terminal;
   receive a call setup request from said GMSC, said call setup request including said roaming number and said authentication code;
   confirming said authentication code in said call setup request; and,
   if said authentication code for said roaming number is confirmed, completing said call request to said mobile terminal.

6. The MSC recited in claim 5, wherein said authentication code is a function of said roaming number.

7. The MSC recited in claim 5, wherein said authentication code is a function of the time at which said roaming number is requested.

8. The MSC recited in claim 5, wherein said authentication code is a function of the date on which said roaming number is requested.

9. A wireless telecommunications system Gateway Mobile Switching Center (GMSC) adapted to prevent unauthorized use of roaming numbers, said GMSC operative to:
   receive a call request for a mobile;
   send a request for routing information to a Home Location Register (HLR) associated with said mobile terminal, said request for routing information causing said HLR to send a request for a roaming number to a Mobile Switching Center (MSC) associated with the roaming area in which said mobile terminal is geographically located, said request for a roaming number causing said MSC to allocate a roaming number for said mobile terminal, assign an authentication code to said roaming number, and send a response to said request for roaming number to said HLR, said response including said roaming number and said authentication code;
   receive said roaming number and said authentication code from said HLR;
   sending a call setup request from said GMSC to said MSC, said call setup request including said roaming number and said authentication code, said MSC completing said call request only upon confirming said authentication code for said roaming number.

10. The GMSC recited in claim 9, wherein said authentication code is a function of said roaming number.

11. The GMSC recited in claim 9, wherein said authentication code is a function of the time at which said roaming number is requested.

12. The GMSC recited in claim 9, wherein said authentication code is a function of the date on which said roaming number is requested.

13. A wireless telecommunications system Home Location Register (HLR) adapted to prevent unauthorized use of roaming numbers, said HLR operative to:
   receive a request for routing information from a Gateway Mobile Switching Center (GMSC), said request for routing information identifying a mobile terminal associated with said HLR for which said GMSC has received a call request;
   sending a request for a roaming number from said HLR to the Mobile Switching Center (MSC) associated with the roaming area in which said mobile terminal is geographically located, said request for a roaming number causing said MSC to allocate a roaming number for said mobile terminal, assign an authentication code to said roaming number, and send a response to said request for roaming number to said HLR, said response including said roaming number and said authentication code;
   receiving said roaming number and said authentication code at said HLR;
   sending said roaming number and said authentication code from said HLR to said GMSC, whereupon said GMSC can send a call setup request from said GMSC to said MSC, said call setup request including said roaming number and said authentication code, said MSC completing said call request only upon confirming said authentication code for said roaming number.

14. The HLR recited in claim 13, wherein said authentication code is a function of said roaming number.

15. The HLR recited in claim 13, wherein said authentication code is a function of the time at which said roaming number is requested.

16. The HLR recited in claim 13, wherein said authentication code is a function of the date on which said roaming number is requested.

\* \* \* \* \*